US012728764B2

(12) United States Patent
Lee et al.

(10) Patent No.: US 12,728,764 B2
(45) Date of Patent: Sep. 8, 2026

(54) APPARATUS FOR CORRECTING OCV OF VEHICLE BATTERY AND METHOD THEREOF

(71) Applicants: Hyundai Motor Company, Seoul (KR); Kia Corporation, Seoul (KR)

(72) Inventors: Sang Jin Lee, Hwaseong-si (KR); Kyung Hyun Lim, Hanam-si (KR); Jun Ho Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 30 days.

(21) Appl. No.: 18/790,006

(22) Filed: Jul. 31, 2024

(65) Prior Publication Data

US 2025/0249787 A1 Aug. 7, 2025

(30) Foreign Application Priority Data

Feb. 2, 2024 (KR) ........................ 10-2024-0016787

(51) Int. Cl.
*B60L 58/12* (2019.01)
*B60L 58/16* (2019.01)

(52) U.S. Cl.
CPC ............... *B60L 58/12* (2019.02); *B60L 58/16* (2019.02); *B60L 2240/545* (2013.01); *B60L 2240/547* (2013.01)

(58) Field of Classification Search
None
See application file for complete search history.

(56) References Cited

U.S. PATENT DOCUMENTS

2004/0032264 A1* 2/2004 Schoch ................ G01R 31/379 324/426
2009/0088994 A1* 4/2009 Machiyama .......... H01M 10/48 702/63
2010/0042345 A1* 2/2010 Kang .................. G01R 31/389 702/65
2015/0357852 A1* 12/2015 Nakao .................. H01M 10/48 702/63
2020/0132782 A1* 4/2020 Hong .................... H01M 10/44
2021/0033678 A1* 2/2021 Yun ...................... G01R 31/374

* cited by examiner

*Primary Examiner* — James J Lee
*Assistant Examiner* — Melanie G Huber
(74) *Attorney, Agent, or Firm* — Slater Matsil, LLP

(57) ABSTRACT

An embodiment apparatus for correcting an open circuit voltage (OCV) of a vehicle battery includes a storage configured to store a base OCV map for a low-voltage battery of a vehicle and a controller configured to convert the base OCV map into a target OCV map by using status information of the vehicle and status information of the low-voltage battery and correct a target OCV on the target OCV map based on a correction value corresponding to a number of days of parking of the vehicle, a correction value corresponding to a temperature of the low-voltage battery, or both the correction value corresponding to the number of days of parking of the vehicle and the correction value corresponding to the temperature of the low-voltage battery.

20 Claims, 7 Drawing Sheets

| PARKING DAYS | OCV CORRECTION VALUE | | | | |
|---|---|---|---|---|---|
| | 0% | 20% | 50% | 70% | 100% |
| 7 DAYS | −0.074 | 0.024 | 0.011 | −0.015 | −0.008 |
| 28 DAYS | −0.032 | 0.128 | 0.096 | 0.081 | 0.055 |

| PARKING DAYS | OCV CORRECTION VALUE | | | | |
|---|---|---|---|---|---|
| | 0% | 20% | 50% | 70% | 100% |
| 7 DAYS | −0.074 | 0.024 | 0.011 | −0.015 | −0.008 |
| 28 DAYS | −0.032 | 0.128 | 0.096 | 0.081 | 0.055 |

FIG.3

| TEMPERATURE | OCV CORRECTION VALUE | | | | |
|---|---|---|---|---|---|
| | 0% | 20% | 50% | 70% | 100% |
| 0℃ | -0.002 | -0.018 | -0.012 | -0.008 | -0.005 |
| 25℃ | 0.004 | 0.008 | 0.005 | 0.002 | 0.001 |

FIG.4

| ITEM | | OCV CORRECTION VALUE (V) | | | | | | | | | | |
|---|---|---|---|---|---|---|---|---|---|---|---|---|
| | | 0% | 10% | 20% | 30% | 40% | 50% | 60% | 70% | 80% | 90% | 100% |
| PARKING DAYS | LESS THAN 7 DAYS | | | | | | | | | | | |
| | 7 DAYS | −0.074 | | 0.024 | | | 0.011 | | −0.015 | | | −0.008 |
| | 14 DAYS | | | | | | | | | 0.03 | | |
| | 28 DAYS | −0.032 | | 0.128 | | | 0.096 | | 0.081 | | | 0.055 |
| | MORE THAN 28 DAYS | | | | | | | | | | | |
| TEMPERATURE | BELOW 0℃ | | | | | | | | | | | |
| | 0℃ | −0.002 | | −0.018 | | | −0.012 | | −0.008 | | | −0.005 |
| | 20℃ | | | | | | | | | −0.0005 | | |
| | 25℃ | 0.04 | | 0.008 | | | 0.005 | | 0.002 | | | 0.001 |
| | ABOVE 25℃ | | | | | | | | | | | |

FIG.5

APPARATUS FOR CORRECTING OCV OF VEHICLE BATTERY AND METHOD THEREOF

CROSS-REFERENCE TO RELATED APPLICATIONS

This application claims the benefit of Korean Patent Application No. 10-2024-0016787, filed on Feb. 2, 2024, which application is hereby incorporated herein by reference.

TECHNICAL FIELD

The present disclosure relates to a technology for correcting an open circuit voltage (OCV) of a battery (e.g., a low-voltage battery) installed in a vehicle (e.g., an electric vehicle).

BACKGROUND

In general, an electric vehicle, which is driven by driving an electric motor using a high-voltage battery, includes a hybrid electric vehicle (HEV), an electric vehicle (EV), a plug-in hybrid electric vehicle (PHEV), a fuel cell electric vehicle (FCEV), and the like.

Such an electric vehicle is equipped with a high-voltage battery for supplying driving power and a low-voltage battery for supplying operating power to internal electric devices (electrical loads). When the state-of-charge (SOC) of the low-voltage battery does not exceed a reference value (e.g., 80%), a low-voltage DC-DC converter (LDC) connected to the low-voltage battery and an electrical device converts (down converts) the high voltage of the high-voltage battery to the charging voltage of the low-voltage battery to charge the low-voltage battery.

The low-voltage battery not only starts the electric vehicle (completes preparation for departure), but it also supplies operating power to electrical devices such as various lamps, systems, electronic control units (ECUs), and the like. In particular, the low-voltage battery supplies operating power to an afterblow, a built-in cam, an over-the-air (OTA) function of an ECU, and the like even while parking.

As such low-voltage batteries, lead-acid storage batteries that can be recharged and used even when completely discharged have been mainly used. However, these lead-acid storage batteries are heavy and have low charging density (charging efficiency).

Meanwhile, an intelligent battery sensor (IBS), which calculates the SOC of the low-voltage battery installed in an electric vehicle, calculates the SOC without considering the charging efficiency of the low-voltage battery, so an error may occur between the calculated SOC value and the actual SOC value of the low-voltage battery. Such an error becomes larger as the number of charging times of the low-voltage battery increases.

For example, when it is assumed that the SOC of the low-voltage battery is 80% and the charging efficiency ($\eta$) is 0.5, the SOC of the low-voltage battery calculated by the IBS after one charge is 90%, but the actual SOC of the low-voltage battery is 85%. Thereafter, when the low-voltage battery is discharged, the SOC of the low-voltage battery calculated by the IBS is 80%, but the actual SOC of the low-voltage battery is 75%. After secondary charging, the SOC of the low-voltage battery calculated by the IBS is 90%, but the actual SOC of the low-voltage battery is 80%.

In the end, a conventional technology for calculating the SOC of the low-voltage battery installed in an electric vehicle calculates the SOC without considering the charging efficiency of the low-voltage battery, so as the number of charging times for the low-voltage battery increases, the error between the SOC value of the low-voltage battery and the actual SOC value of the low-voltage battery increases.

The matters described in this background section are intended to promote an understanding of the background of the disclosure and may include matters that are not already known to those of ordinary skill in the art.

SUMMARY

Embodiments of the present disclosure can solve problems occurring in the prior art while advantages achieved by the prior art are maintained intact.

An embodiment of the present disclosure provides an apparatus for correcting an open circuit voltage (OCV) of a vehicle battery and a method thereof capable of reducing an error between a calculated state-of-charge (SOC) of a battery and an actual SOC by converting a base OCV map into a target OCV map by using vehicle status information and battery status information and correcting a target OCV on the target OCV map based on a correction value corresponding to the number of days of parking of the vehicle and a correction value corresponding to the temperature of the battery.

Another embodiment of the present disclosure provides an apparatus for correcting an OCV of a vehicle battery and a method thereof capable of reducing an error between a calculated SOC of a battery and an actual SOC by converting a base OCV map into a target OCV map by using vehicle status information and battery status information and correcting a target OCV on the target OCV map based on a correction value corresponding to the number of days of parking of the vehicle.

Still another embodiment of the present disclosure provides an apparatus for correcting an OCV of a vehicle battery and a method thereof capable of reducing an error between a calculated SOC of a battery and an actual SOC by converting a base OCV map into a target OCV map by using vehicle status information and battery status information and correcting a target OCV on the target OCV map based on a correction value corresponding to the temperature of the battery.

The technical problems solvable by embodiments of the present disclosure are not limited to the aforementioned problems, and any other technical problems not mentioned herein will be clearly understood from the following description by those skilled in the art to which the present disclosure pertains. Also, it may be easily understood that the objects and advantages of embodiments of the present disclosure may be realized by the units and combinations thereof recited in the claims.

According to an embodiment of the present disclosure, an apparatus for correcting an open circuit voltage of a vehicle battery includes a storage that stores a base open circuit voltage (OCV) map for a low-voltage battery of a vehicle, and a controller that converts the base OCV map into a target OCV map by using status information of the vehicle and status information of the low-voltage battery and corrects a target OCV on the target OCV map based on at least one of a correction value corresponding to a number of days of parking of the vehicle and a correction value corresponding to a temperature of the low-voltage battery.

According to an embodiment, the storage may further store a correction value corresponding to the status information of the vehicle and a correction value corresponding to the status information of the low-voltage battery.

According to an embodiment, the controller may convert the base OCV map into the target OCV map by adding or subtracting the correction value corresponding to the status information of the vehicle and the correction value corresponding to the status information of the low-voltage battery to or from each OCV on the base OCV map.

According to an embodiment, the correction value corresponding to the status information of the vehicle may include at least one of a correction value (C1) corresponding to a parked vehicle, a correction value (C2) corresponding to a travelling vehicle, a correction value (C3) corresponding to an aged vehicle, a correction value (C4) corresponding to a charging vehicle, a correction value (C5) corresponding to a discharging vehicle, or a combination thereof.

According to an embodiment, the correction value corresponding to the status information of the low-voltage battery may include at least one of a correction value (B1) corresponding to a complete maintenance free (CMF) type low-voltage battery, a correction value (B2) corresponding to an absorbent glass mat (AGM) type low-voltage battery, a correction value (B3) corresponding to a lithium-ion type low-voltage battery, a correction value (B4) corresponding to a fully charged low-voltage battery, or a combination thereof.

According to an embodiment, the storage may further store at least one of a first correction value table in which a correction value corresponding to the number of days of parking of the vehicle is recorded or a second correction value table in which a correction value corresponding to the temperature of the low-voltage battery is recorded.

According to an embodiment, the controller may detect the correction value corresponding to the number of days of parking of the vehicle in the first correction value table and add or subtract the detected correction value to or from the target OCV on the target OCV map.

According to an embodiment, the controller may detect the correction value corresponding to the temperature of the low-voltage battery in the second correction value table and add or subtract the detected correction value to or from the target OCV on the target OCV map.

According to an embodiment, the controller may detect a first correction value corresponding to the number of days of parking of the vehicle in the first correction value table, detect a second correction value corresponding to the temperature of the low-voltage battery in the second correction value table, and add or subtract the first correction value and the second correction value to the target OCV on the target OCV map.

According to another embodiment of the present disclosure, a method of correcting an open circuit voltage of a vehicle battery includes storing, by a storage, a base open circuit voltage (OCV) map for a low-voltage battery of a vehicle, converting, by a controller, the base OCV map into a target OCV map by using status information of the vehicle and status information of the low-voltage battery, and correcting, by the controller, a target OCV on the target OCV map based on at least one of a correction value corresponding to a number of days of parking of the vehicle and a correction value corresponding to a temperature of the low-voltage battery.

According to an embodiment, the method may further include storing, by the storage, a correction value corresponding to the status information of the vehicle and a correction value corresponding to the status information of the low-voltage battery.

According to an embodiment, the converting of the base OCV map into the target OCV map may include adding or subtracting, by the controller, the correction value corresponding to the status information of the vehicle and the correction value corresponding to the status information of the low-voltage battery to or from each OCV on the base OCV map.

According to an embodiment, the correction value corresponding to the status information of the vehicle may include at least one of a correction value (C1) corresponding to a parked vehicle, a correction value (C2) corresponding to a travelling vehicle, a correction value (C3) corresponding to an aged vehicle, a correction value (C4) corresponding to a charging vehicle, a correction value (C5) corresponding to a discharging vehicle, or a combination thereof.

According to an embodiment, the correction value corresponding to the status information of the low-voltage battery may include at least one of a correction value (B1) corresponding to a complete maintenance free (CMF) type low-voltage battery, a correction value (B2) corresponding to an absorbent glass mat (AGM) type low-voltage battery, a correction value (B3) corresponding to a lithium-ion type low-voltage battery, a correction value (B4) corresponding to a fully charged low-voltage battery, or a combination thereof.

According to an embodiment, the method may further include storing, by the storage, at least one of a first correction value table in which a correction value corresponding to the number of days of parking of the vehicle is recorded, or a second correction value table in which a correction value corresponding to the temperature of the low-voltage battery is recorded.

According to an embodiment, the correcting of the target OCV on the target OCV map may include detecting, by the controller, the correction value corresponding to the number of days of parking of the vehicle in the first correction value table and adding or subtracting, by the controller, the detected correction value to or from the target OCV on the target OCV map.

According to an embodiment, the correcting of the target OCV on the target OCV map may include detecting, by the controller, the correction value corresponding to the temperature of the low-voltage battery in the second correction value table and adding or subtracting, by the controller, the detected correction value to or from the target OCV on the target OCV map.

According to an embodiment, the correcting of the target OCV on the target OCV map may include detecting, by the controller, a first correction value corresponding to the number of days of parking of the vehicle in the first correction value table, detecting, by the controller, a second correction value corresponding to the temperature of the low-voltage battery in the second correction value table, and adding or subtracting, by the controller, the first correction value and the second correction value to the target OCV on the target OCV map.

BRIEF DESCRIPTION OF THE DRAWINGS

The above and other objects, features, and advantages of embodiments of the present disclosure will be more apparent from the following detailed description taken in conjunction with the accompanying drawings, in which:

FIG. 3 is a diagram illustrating a first correction value table provided in an apparatus for correcting an OCV of a vehicle battery according to an embodiment of the present disclosure;

FIG. 4 is a diagram illustrating a second correction value table provided in an apparatus for correcting an OCV of a vehicle battery according to an embodiment of the present disclosure;

FIG. 5 is a diagram illustrating the results of applying linear interpolation and extrapolation schemes to the first correction value table and the second correction value table by a controller provided in an apparatus for correcting an OCV of a vehicle battery according to an embodiment of the present disclosure;

DETAILED DESCRIPTION OF ILLUSTRATIVE EMBODIMENTS

Figure 1:
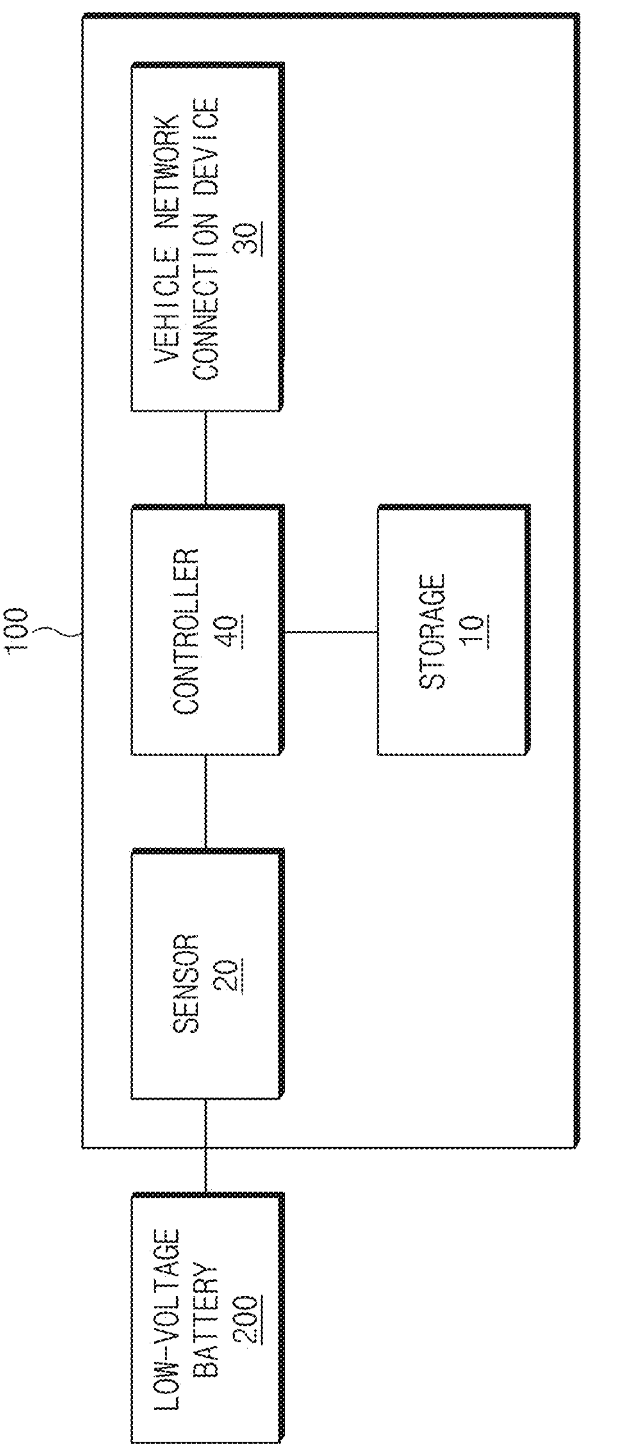
FIG. 1 is a block diagram illustrating a configuration of an apparatus for correcting an OCV of a vehicle battery according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when it is displayed on other drawings. Further, in describing the embodiments of the present disclosure, a detailed description of the related known configuration or function will be omitted when it is determined that it interferes with the understanding of the embodiments of the present disclosure.

In addition, terms such as first, second, A, B, (a), (b) or the like may be used herein when describing components of embodiments of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as having ideal or excessively formal meanings unless clearly defined in the specification of the present disclosure.

FIG. 1 is a block diagram illustrating a configuration of an apparatus for correcting an OCV of a vehicle battery according to an embodiment of the present disclosure. In this case, an example configured separately from an intelligent battery sensor (IBS) provided in a vehicle will be described, but in another embodiment, the IBS may be implemented to perform all functions of the apparatus for correcting an OCV of a vehicle battery.

As shown in FIG. 1, an apparatus 100 for correcting an OCV of a vehicle battery according to an embodiment of the present disclosure may include a storage 10, a sensor 20, a vehicle network connection device 30, and a controller 40. In this case, depending on a scheme of implementing the apparatus 100 for correcting an OCV of a vehicle battery according to an embodiment of the present disclosure, components may be combined with each other to be implemented as one, or some components may be omitted.

Regarding each component, first, the storage 10 may store various logic, algorithms, and programs required in the process of converting a base OCV map (or table) into a target OCV map by using status information of a vehicle and status information of a low-voltage battery 200 and correcting a target OCV on the target OCV map based on a correction value corresponding to the number of days of parking of the vehicle and a correction value corresponding to the temperature of the low-voltage battery 200.

The storage 10 may store various logic, algorithms, and programs required in the process of converting the base OCV map into the target OCV map by using the status information of the vehicle and the status information of the low-voltage battery 200 and correcting the target OCV on the target OCV map based on the correction value corresponding to the number of days of parking of the vehicle.

The storage 10 may store various logic, algorithms, and programs required in the process of converting the base OCV map into the target OCV map by using the status information of the vehicle and the status information of the low-voltage battery 200 and correcting the target OCV on the target OCV map based on the correction value corresponding to the temperature of the low-voltage battery 200.

The storage 10 may store the correction value corresponding to the status information of the vehicle. For example, the storage 10 may store correction value C1 corresponding to a parked vehicle, correction value C2 corresponding to a travelling vehicle, correction value C3 corresponding to an aged vehicle, correction value C4 corresponding to a charging vehicle, correction value C5 corresponding to a discharging vehicle, and the like. In this case, a charging vehicle refers to a vehicle whose low-voltage battery 200 is being charged, and a discharging vehicle refers to a vehicle whose low-voltage battery 200 is being discharged. In addition, an aged vehicle refers to a vehicle in which the accumulated discharge amount (Ah) of a low-voltage battery exceeds a reference value.

The storage 10 may store a correction value corresponding to status information of the low-voltage battery 200 provided in the vehicle. For example, the storage 10 may store correction value B1 corresponding to a complete maintenance free (CMF) type low-voltage battery 200, correction value B2 corresponding to an absorbent glass mat (AGM) type low-voltage battery 200, correction value B3 corresponding to a lithium-ion type low-voltage battery 200, correction value B4 corresponding to a fully charged low-voltage battery 200, and the like.

The storage 10 may store a base OCV map according to the unique characteristics of the low-voltage battery 200. Such a base OCV map refers to a table in which an OCV corresponding to the state of charge (SOC) of the low-voltage battery 200 is recorded. The base OCV map is, for example, reference numeral 210 shown in FIG. 2.

The storage 10 may store the target OCV map generated by the controller 40. The target OCV map refers to a base OCV map that reflects the state of the vehicle and the state of the low-voltage battery 200. That is, the correction value according to the state of the vehicle and the correction value according to the state of the low-voltage battery 200 may be added to or subtracted from the OCV on the base OCV map to generate the target OCV map. The target OCV map is, for example, reference numeral 220 shown in FIG. 2.

Figure 2:
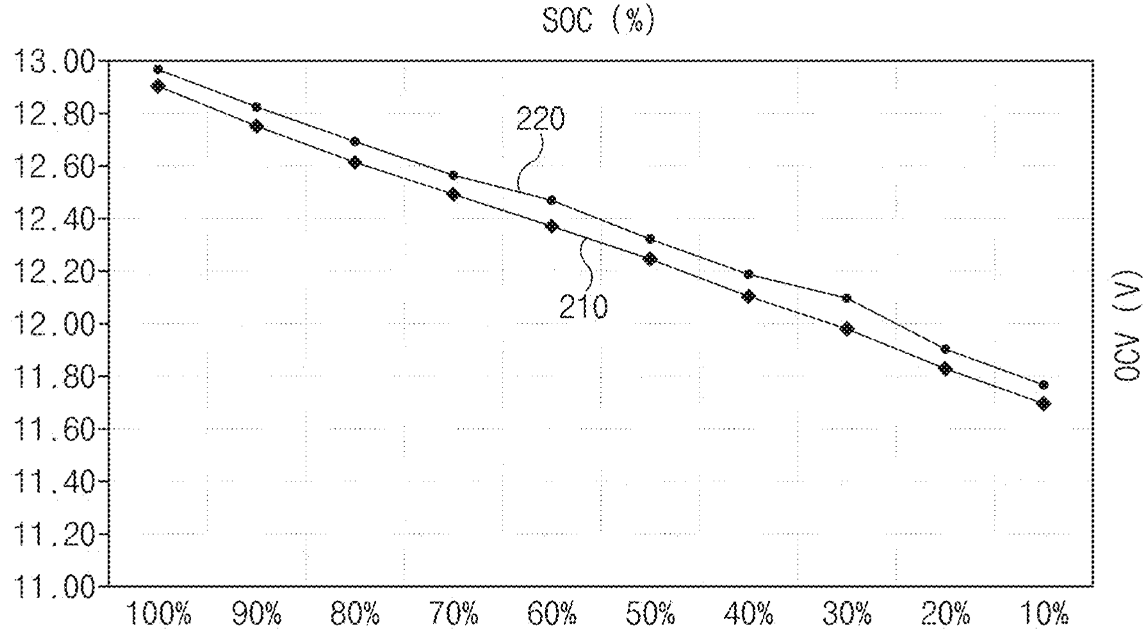
FIG. 2 is a diagram illustrating a base OCV map and a target OCV map provided in an apparatus for correcting an OCV of a vehicle battery according to an embodiment of the present disclosure.

FIG. 2 is a diagram illustrating a base OCV map and a target OCV map provided in an apparatus for correcting an OCV of a vehicle battery according to an embodiment of the present disclosure.

As shown in FIG. 2, the horizontal axis represents an SOC (%) of the low-voltage battery 200, and the vertical axis represents an OCV (V) of the low-voltage battery 200. For example, when the SOC of the low-voltage battery 200 is 80%, a base OCV 210 is 12.625 V, but the target OCV 220 is 12.687 V.

The storage 10 may store a first correction value table in which correction values corresponding to the number of days the vehicle has been parked (i.e., the number of days the vehicle has been continuously parked) are recorded. As an example, this first correction value table is as shown in FIG. 3.

FIG. 3 is a diagram illustrating a first correction value table provided in an apparatus for correcting an OCV of a vehicle battery according to an embodiment of the present disclosure.

As shown in FIG. 3, the first correction value table specifies only the correction value when the number of days the vehicle is parked is 7 days and the correction value when the number of parking days is 28. However, the first correction value table may include correction values for other parking days obtained through linear interpolation and extrapolation schemes.

In addition, the first correction value table specifies only correction values for the SOCs of 0%, 20%, 50%, 70%, and 100%, but similarly, the first correction value table may include other SOCs obtained through linear interpolation and extrapolation schemes.

In FIG. 3, when the number of days of parking of the vehicle is 7 days, the OCV correction value for the SOC of 0% is −0.074, the OCV correction value for the SOC of 20% is 0.024, the OCV correction value for the SOC of 50% is 0.011, the OCV correction value for the SOC of 70% is −0.015, and the OCV correction value for the SOC of 100% is −0.008.

When the number of days of parking of the vehicle is 28 days, the OCV correction value for the SOC of 0% is −0.032, the OCV correction value for the SOC of 20% is 0.128, the OCV correction value for the SOC of 50% is 0.096, the OCV correction value for the SOC of 70% is 0.081, and the OCV correction value for the SOC of 100% is 0.055.

The storage 10 may store a second correction value table in which correction values corresponding to the temperature of the low-voltage battery 200 are recorded. The second correction value table is as shown in FIG. 4 as an example.

FIG. 4 is a diagram illustrating a second correction value table provided in an apparatus for correcting an OCV of a vehicle battery according to an embodiment of the present disclosure.

As shown in FIG. 4, the second correction value table specifies only the correction value when the temperature of the low-voltage battery 200 is 0° C. and the correction value when the temperature of the low-voltage battery 200 is 25° C., but correction values for other temperatures obtained through linear interpolation and extrapolation schemes may be included.

In addition, the second correction value table specifies only correction values for the SOCs of 0%, 20%, 50%, 70%, and 100%, but similarly, the second correction value table may include other SOCs obtained through linear interpolation and extrapolation schemes.

In FIG. 4, when the temperature of the low-voltage battery 200 is 0° C., the OCV correction value for the SOC of 0% is −0.002, the OCV correction value for the SOC of 20% is −0.018, the OCV correction value for the SOC of 50% is −0.012, the OCV correction value for the SOC of 70% is −0.008, and the OCV correction value for the SOC of 100% is −0.005.

When the temperature of the low-voltage battery 200 is 25° C., the OCV correction value for the SOC of 0% is 0.004, the OCV correction value for the SOC of 20% is 0.008, the OCV correction value for the SOC of 50% is 0.005, the OCV correction value for the SOC of 70% is 0.002, and the OCV correction value for the SOC of 100% is 0.001.

The sensor 20, which is a sensor that measures the state of the low-voltage battery 200, may include a voltage sensor that measures the voltage of the low-voltage battery 200, a current sensor that measures the current of the low-voltage battery 200, and a temperature sensor that measures the temperature of the low-voltage battery 200.

The vehicle network connection device 30 may be a module that provides a connection interface with a network used to monitor the status of the vehicle. The controller 40 may connect to the vehicle network through the vehicle network connection device 30 to obtain information indicating whether the vehicle is parked or drives (e.g., key state value, on=driving, off=parking) and information (e.g., SOC information) indicating whether the vehicle is charging or discharging.

The controller 40 may be electrically connected to each component and perform overall control such that each component performs its function. The controller 40 may be implemented in the form of hardware or software, or it may be implemented in a combination of hardware and software. Preferably, the controller 40 may be implemented as a microprocessor, but it is not limited thereto.

Hereinafter, the operation of the controller 40 will be described in detail with reference to FIGS. 2 to 5.

First, the controller 40 may convert the base OCV map into a target OCV map by using the status information of the vehicle and the status information of the low-voltage battery 200. That is, as shown in FIG. 2, the controller 40 may apply (i.e., add or subtract) at least one of a correction value corresponding to the status information of the vehicle and a correction value corresponding to the status information of the low-voltage battery 200 to the base OCV map 210 to generate the target OCV map 220.

For example, the controller 40 may apply at least one of the correction value C1 corresponding to a parked vehicle, the correction value C2 corresponding to a travelling vehicle, the correction value C3 corresponding to an aged vehicle, the correction value C4 corresponding to a charging vehicle, and the correction value C5 corresponding to a discharging vehicle as the correction value corresponding to the status information of the vehicle to the base OCV map 210.

In this case, the controller 40 may determine an aged vehicle when the accumulated discharge amount (Ah) of the low-voltage battery 200 exceeds a reference value. In addition, the controller 40 may determine discharging when the SOC of the low-voltage battery 200 decreases, and it may determine charging when the SOC of the low-voltage battery 200 increases.

As another example, the controller 40 may apply at least one of the correction value B1 corresponding to the CMF type low-voltage battery 200, the correction value B2 corresponding to the AGM type low-voltage battery 200, the correction value B3 corresponding to the lithium-ion type low-voltage battery 200, and the correction value B4 corresponding to the fully charged low-voltage battery 200 as the status information of the low-voltage battery 200 to the base OCV map 210.

In this case, the controller 40 may determine the type of the low-voltage battery 200 based on the voltage, current, and internal resistance of the low-voltage battery 200. For reference, CMF, AGM, and lithium ion each have their own unique characteristics.

Next, the controller 40 may apply linear interpolation to the first correction value table shown in FIG. 3 and the second correction value table shown in FIG. 4 to determine the target OCV correction value when the SOC of the low-voltage battery 200 is 80% and the number of parking days (i.e., the number of consecutively parking days) is 14 days and to determine the target OCV correction value when the SOC of the low-voltage battery 200 is 80% and the temperature of the low-voltage battery 200 is 20° C. as shown in FIG. 5.

FIG. 5 is a diagram illustrating the results of applying linear interpolation and extrapolation schemes to the first correction value table and the second correction value table by a controller provided in an apparatus for correcting an OCV of a vehicle battery according to an embodiment of the present disclosure.

As shown in FIG. 5, the controller 40 may determine the target OCV correction value to be 0.03 when the SOC of the low-voltage battery 200 is 80% and the number of parking days is 14 days. In addition, the controller 40 may determine the target OCV correction value to be −0.0005 when the SOC of the low-voltage battery 200 is 80% and the temperature of the low-voltage battery 200 is 20° C.

Next, the controller 40 may correct the target OCV on the target OCV map based on a correction value corresponding to the number of days the vehicle has been parked and a correction value corresponding to the temperature of the low-voltage battery 200.

For example, when the SOC of the low-voltage battery 200 is 80%, the number of parking days is 14 days, and the temperature of the low-voltage battery 200 is 20° C., the controller 40 may apply the target OCV correction value of 0.03 corresponding to the SOC of 80% and the number of parking days of 14 days and the target correction value of −0.0005 corresponding to the SOC of 80% and the temperature of 20° C. to the target OCV of 12.687 corresponding to the SOC of 80% to determine the OCV of the low-voltage battery 200. In this case, the OCV of the low-voltage battery 200 is 12.7165 (=12.687+0.03−0.0005).

Figure 6:
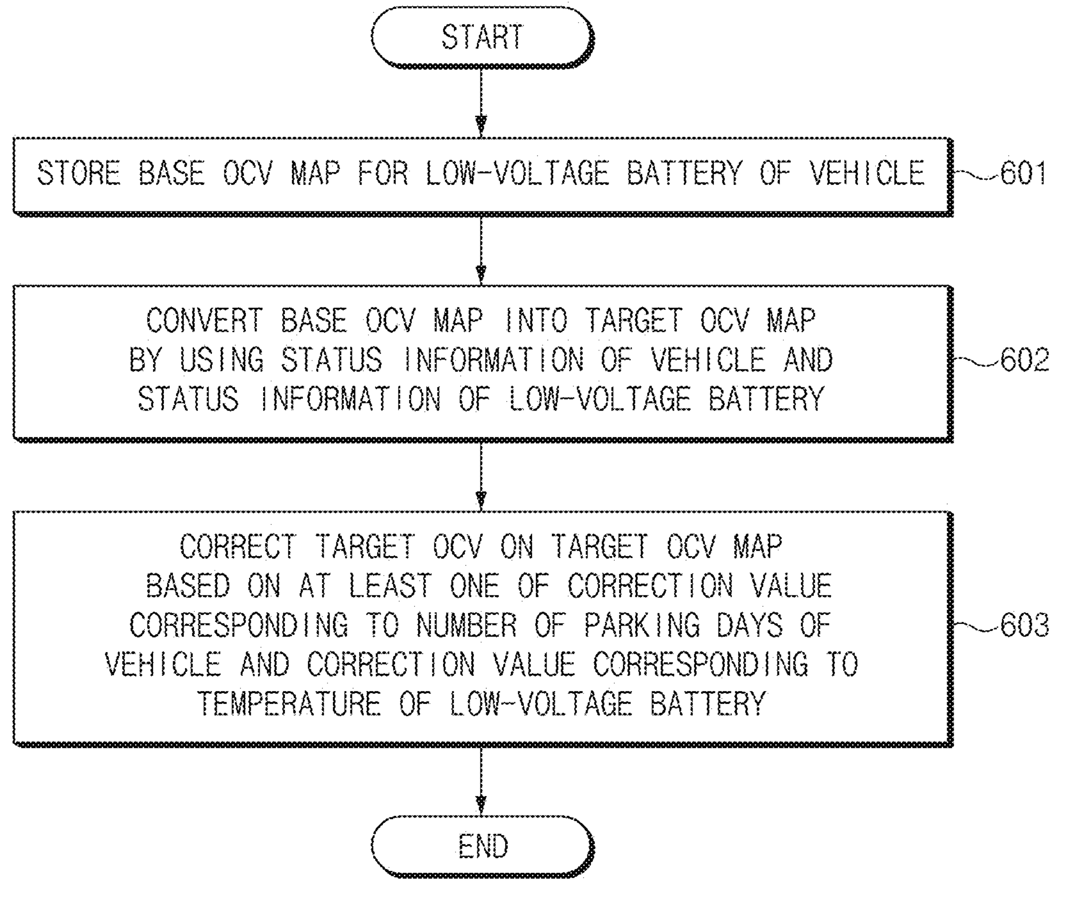
FIG. 6 is a flowchart illustrating a method of correcting an OCV of a vehicle battery according to an embodiment of the present disclosure.

FIG. 6 is a flowchart illustrating a method of correcting an OCV of a vehicle battery according to an embodiment of the present disclosure.

First, in 601, the storage 10 stores a base OCV map for a low-voltage battery of a vehicle.

Then, in 602, the controller 40 converts the base OCV map into a target OCV map by using the status information of the vehicle and the status information of the low-voltage battery.

Then, in 603, based on at least one of a correction value corresponding to the number of parking days of the vehicle and a correction value corresponding to the temperature of the low-voltage battery, the controller 40 corrects the target OCV on the target OCV map.

Figure 7:
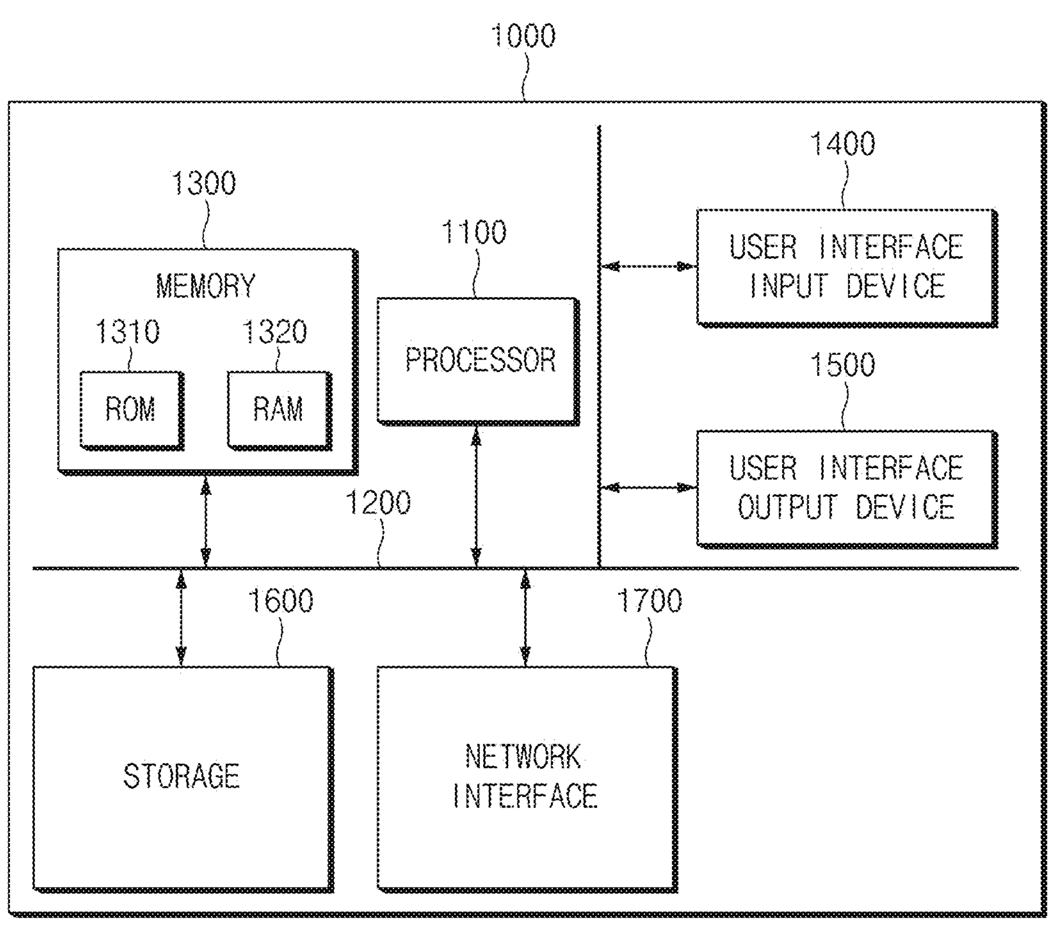
FIG. 7 is a block diagram illustrating a computing system for executing a method of correcting an OCV of a vehicle battery according to each embodiment of the present disclosure.

FIG. 7 is a block diagram illustrating a computing system for executing a method of correcting an OCV of a vehicle battery according to each embodiment of the present disclosure.

Referring to FIG. 7, a method of correcting an OCV of a vehicle battery according to an embodiment of the present disclosure described above may be implemented through a computing system 1000. The computing system 1000 may include at least one processor 1100, a memory 1300, a user interface input device 1400, a user interface output device 1500, a storage (i.e., a memory) 1600, and a network interface 1700 connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, a solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

According to the embodiments of the present disclosure, it is possible to reduce an error between the calculated SOC and the actual SOC of a battery by converting a base OCV map into a target OCV map by using vehicle status information and battery status information and by correcting a target OCV on the target OCV map based on a correction value corresponding to the number of parking days of the vehicle and a correction value corresponding to the temperature of the battery.

Although exemplary embodiments of the present disclosure have been described for illustrative purposes, those skilled in the art will appreciate that various modifications, additions, and substitutions are possible, without departing from the scope and spirit of the disclosure. Therefore, the exemplary embodiments disclosed in the present disclosure are provided for the sake of descriptions and are not limiting of the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for correcting an open circuit voltage (OCV) of a vehicle battery, the apparatus comprising:

a storage configured to store a base OCV map for a low-voltage battery of a vehicle; and a controller configured to:

generate a target OCV map based on the base OCV map stored in the storage by using status information of the vehicle and status information of the low-voltage battery;

correct a target OCV on the target OCV map based on both a correction value corresponding to a number of days of parking of the vehicle and a correction value corresponding to a temperature of the low-voltage battery; and correct the OCV of the vehicle battery based on the target OCV map.

2. The apparatus of claim 1, wherein the storage is configured to further store a correction value corresponding to the status information of the vehicle and a correction value corresponding to the status information of the low-voltage battery.

3. The apparatus of claim 2, wherein the controller is configured to generate a target OCV map based on the base OCV map stored in the storage by adding or subtracting the correction value corresponding to the status information of the vehicle and the correction value corresponding to the status information of the low-voltage battery to or from each OCV on the base OCV map.

4. The apparatus of claim 2, wherein the correction value corresponding to the status information of the vehicle comprises one or more of a correction value corresponding to a parked vehicle, a correction value corresponding to a travelling vehicle, a correction value corresponding to an aged vehicle, a correction value corresponding to a charging correction value corresponding to a discharging vehicle.

5. The apparatus of claim 2, wherein the correction value corresponding to the status information of the low-voltage battery comprises one or more of a correction value corresponding to a complete maintenance free type low-voltage battery, a correction value corresponding to an absorbent glass mat type low-voltage battery, a correction value corresponding to a lithium-ion type low-voltage battery, or a correction value corresponding to a fully charged low-voltage battery.

6. The apparatus of claim 1, wherein the storage is configured to further store a first correction value table in which a correction value corresponding to the number of days of parking of the vehicle is recorded, a second correction value table in which a correction value corresponding to the temperature of the low-voltage battery is recorded, or both the first correction value table and the second correction value table.

7. The apparatus of claim 6, wherein the controller is configured to detect the correction value corresponding to the number of days of parking of the vehicle in the first correction value table and add or subtract the detected correction value to or from the target OCV on the target OCV map.

8. The apparatus of claim 6, wherein the controller is configured to detect the correction value corresponding to the temperature of the low-voltage battery in the second correction value table and add or subtract the detected correction value to or from the target OCV on the target OCV map.

9. The apparatus of claim 6, wherein the controller is configured to detect a first correction value corresponding to the number of days of parking of the vehicle in the first correction value table, detect a second correction value corresponding to the temperature of the low-voltage battery in the second correction value table, and add or subtract the first correction value and the second correction value to the target OCV on the target OCV map.

10. A method of correcting an open circuit voltage (OCV) of a vehicle battery, the method comprising:

storing a base OCV map for a low-voltage battery of a vehicle in a storage;

generating, by a controller, a target OCV map based on the base OCV map stored in the storage by using status information of the vehicle and status information of the low-voltage battery;

correcting, by the controller, a target OCV on the target OCV map based on both a correction value corresponding to a number of days of parking of the vehicle and a correction value corresponding to a temperature of the low-voltage battery; and correct the OCV of the vehicle battery based on the target OCV map.

11. The method of claim 10, further comprising storing in the storage a correction value corresponding to the status information of the vehicle and a correction value corresponding to the status information of the low-voltage battery.

12. The method of claim 11, wherein generating a target OCV map based on the base OCV map stored in the storage includes adding or subtracting, by the controller, the correction value corresponding to the status information of the vehicle and the correction value corresponding to the status information of the low-voltage battery to or from each OCV on the base OCV map.

13. The method of claim 11, wherein the correction value corresponding to the status information of the vehicle comprises one or more of a correction value corresponding to a parked vehicle, a correction value corresponding to a travelling vehicle, a correction value corresponding to an aged vehicle, a correction value corresponding to a charging vehicle, or a correction value corresponding to a discharging vehicle.

14. The method of claim 11, wherein the correction value corresponding to the status information of the low-voltage battery comprises one or more of a correction value corresponding to a complete maintenance free type low-voltage battery, a correction value corresponding to an absorbent glass mat type low-voltage battery, a correction value corresponding to a lithium-ion type low-voltage battery, or a correction value corresponding to a fully charged low-voltage battery.

15. The method of claim 10, further comprising storing in the storage a first correction value table in which a correction value corresponding to the number of days of parking of the vehicle is recorded, a second correction value table in which a correction value corresponding to the temperature of the low-voltage battery is recorded, or both the first correction value table and the second correction value table.

16. The method of claim 15, wherein correcting the target OCV on the target OCV map comprises:

detecting, by the controller, the correction value corresponding to the number of days of parking of the vehicle in the first correction value table; and adding or subtracting, by the controller, the detected correction value to or from the target OCV on the target OCV map.

17. The method of claim 15, wherein correcting the target OCV on the target OCV map comprises:

detecting, by the controller, the correction value corresponding to the temperature of the low-voltage battery in the second correction value table; and adding or subtracting, by the controller, the detected correction value to or from the target OCV on the target OCV map.

18. The method of claim 15, wherein correcting the target OCV on the target OCV map comprises:

detecting, by the controller, a first correction value corresponding to the number of days of parking of the vehicle in the first correction value table;

detecting, by the controller, a second correction value corresponding to the temperature of the low-voltage battery in the second correction value table; and adding or subtracting, by the controller, the first correction value and the second correction value to the target OCV on the target OCV map.

19. An apparatus for correcting an open circuit voltage (OCV) of a vehicle battery, the apparatus comprising:

a storage configured to store a base OCV map for a low-voltage battery of a vehicle;

a sensor configured to measure a temperature of the low-voltage battery; and a controller configured to:

generate a target OCV map based on the base OCV map stored in the storage by using status information of the vehicle and status information of the low-voltage battery;

detect a number of days the vehicle has been parked based on a correction table stored in the storage;

detect a temperature of the low-voltage battery using the sensor;

detect a type of the low-voltage battery based on voltage, current, and internal resistance of the low-voltage battery;

correct a target OCV on the target OCV map based on a correction value corresponding to the detected number of days the vehicle has been parked, a correction value corresponding to the detected temperature of the low-voltage battery, and a correction value corresponding to status information of the low-voltage battery, wherein the correction value corresponding to the status information of the low-voltage battery comprises an indication of the detected battery type of the low-voltage battery; and correct the OCV of the vehicle battery based on the target OCV map.

20. The apparatus of claim 19 wherein the controller is further configured to detect whether the vehicle is an aged vehicle based on an accumulated discharge amount of the low-voltage battery exceeding a reference value, wherein the controller is further configured to correct a target OCV on the target OCV map based on a correction value corresponding to the detected number of days the vehicle has been parked, a correction value corresponding to the detected temperature of the low-voltage battery, a correction value corresponding to status information of the low-voltage battery, and a correction value corresponding to the status information of the vehicle, wherein the status information of the vehicle indicates whether the vehicle is detected to be an aged vehicle.

* * * * *